US009453535B2

United States Patent
Krause et al.

(10) Patent No.: US 9,453,535 B2
(45) Date of Patent: Sep. 27, 2016

(54) OIL RETENTION AND DELIVERY SYSTEM FOR A BEARING

(71) Applicant: Hamilton Sundstrand Corporation, Charlotte, NC (US)

(72) Inventors: Joseph Paul Krause, Downers Grove, IL (US); David S. Behling, Belvidere, IL (US); Jan Henry Abels, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 472 days.

(21) Appl. No.: 14/147,964

(22) Filed: Jan. 6, 2014

(65) Prior Publication Data
US 2015/0252852 A1 Sep. 10, 2015

(51) Int. Cl.
F16C 19/00 (2006.01)
F16C 33/66 (2006.01)
F16C 3/02 (2006.01)
F16N 31/02 (2006.01)

(52) U.S. Cl.
CPC ............. *F16C 33/6677* (2013.01); *F16C 3/02* (2013.01); *F16C 33/664* (2013.01); *F16C 33/6651* (2013.01); *F16C 33/6659* (2013.01); *F16C 33/6685* (2013.01); *F16N 31/02* (2013.01)

(58) Field of Classification Search
CPC ............. F16C 33/6637; F16C 33/664; F16C 33/6659; F16C 33/6677
USPC ................ 384/462, 465, 466, 473, 474, 475
See application file for complete search history.

(56) References Cited

U.S. PATENT DOCUMENTS

| 2,217,801 | A | 10/1940 | Katcher |
| 3,955,359 | A | 5/1976 | Yannone et al. |
| 4,305,627 | A | 12/1981 | Yargici |
| 4,314,705 | A | 2/1982 | Shimizu |
| 5,660,539 | A | 8/1997 | Matsunaga et al. |
| 5,884,727 | A | 3/1999 | Ryu |
| 5,947,709 | A | 9/1999 | Koyama et al. |
| 6,012,911 | A | 1/2000 | Hirooka et al. |
| 7,044,717 | B2 | 5/2006 | Dreiman et al. |
| 7,178,987 | B2 * | 2/2007 | Bridges et al. ............... 384/475 |
| 7,938,616 | B2 | 5/2011 | Gille et al. |
| 7,958,802 | B2 * | 6/2011 | Marin et al. ................ 74/606 R |
| 2004/0179935 | A1 * | 9/2004 | Maguire ....................... 415/111 |
| 2012/0027570 | A1 | 2/2012 | Cigal et al. |

FOREIGN PATENT DOCUMENTS

| EP | 1406026 A1 | 4/2004 |
| WO | 02090789 A1 | 11/2002 |

OTHER PUBLICATIONS

The European Search Report mailed Mar. 4, 2015 for European Application No. 15150153.3.

* cited by examiner

*Primary Examiner* — James Pilkington
(74) *Attorney, Agent, or Firm* — Kinney & Lange, P.A.

(57) ABSTRACT

A bearing seal assembly of a rotary machine includes and inner shaft and an outer shaft. The outer shaft is disposed concentrically around and radially outward from the inner shaft. The space between the inner and outer shafts forms an annulus void. The inner shaft includes an oil inlet port through which lubricating oil enters the annulus void. A grooved structure is located on an inner surface of the outer shaft, and the grooved structure is configured to retain oil upon shutdown of the rotary machine. A bearing is located outside of the outer shaft. An oil outlet port is disposed in the outer shaft and is connected to the grooved structure for supplying lubricating oil to the bearing.

14 Claims, 2 Drawing Sheets

OIL RETENTION AND DELIVERY SYSTEM FOR A BEARING

BACKGROUND

The present disclosure relates generally to the field of bearing assemblies in rotary machines. In particular, the present disclosure relates to the delivery of lubricating oil in bearing assemblies during start-up of the rotary machine.

Bearings in rotary machines usually require some type of lubricant to ensure long life and proper function. Bearing lubrication is critical, especially in high speed, high load, or high temperature applications, such as an aircraft electrical power generator. Typically, most bearing wear occurs when the bearing first begins to rotate and is without oil lubrication. In applications such as an aircraft generator or the like, the oil supply may be pumped to the generator from an oil circuit. Oil delivery to the machine may take some time to reach the bearing, or otherwise be delayed from providing lubricant to the bearing during the critical startup period. Oil delivery to the bearing may be further delayed if the machine is devoid of oil, if pump startup is retarded, or if time is required to establish sufficient oil circuit pressure before oil can flow effectively.

SUMMARY

A bearing seal assembly of a rotary machine includes and inner shaft and an outer shaft. The outer shaft is disposed concentrically around and radially outward from the inner shaft. The space between the inner and outer shafts forms an annulus void. The inner shaft includes an oil inlet port through which lubricating oil enters the annulus void. A grooved structure is located on an inner surface of the outer shaft, and the grooved structure is configured to retain oil upon shutdown of the rotary machine. A bearing is located outside of the outer shaft. An oil outlet port is disposed in the outer shaft and is connected to the grooved structure for supplying lubricating oil to the bearing.

In a method of delivering lubricating oil to a bearing, during steady state operation lubricating oil is supplied through an oil inlet port to an annulus void between an inner shaft and an outer shaft. A substantially continuous oil annulus is formed in a grooved structure located on an inner radial surface of the outer shaft. Lubricating oil is provided from the grooved structure through an oil outlet port in the outer shaft to the bearing during steady-state operation. Lubricating oil is retained in the grooved structure during a shut-down state. Lubricating oil is then provided to the bearing from the grooved structure through the oil outlet port during start-up of the rotary machine.

DETAILED DESCRIPTION

Figure 1:
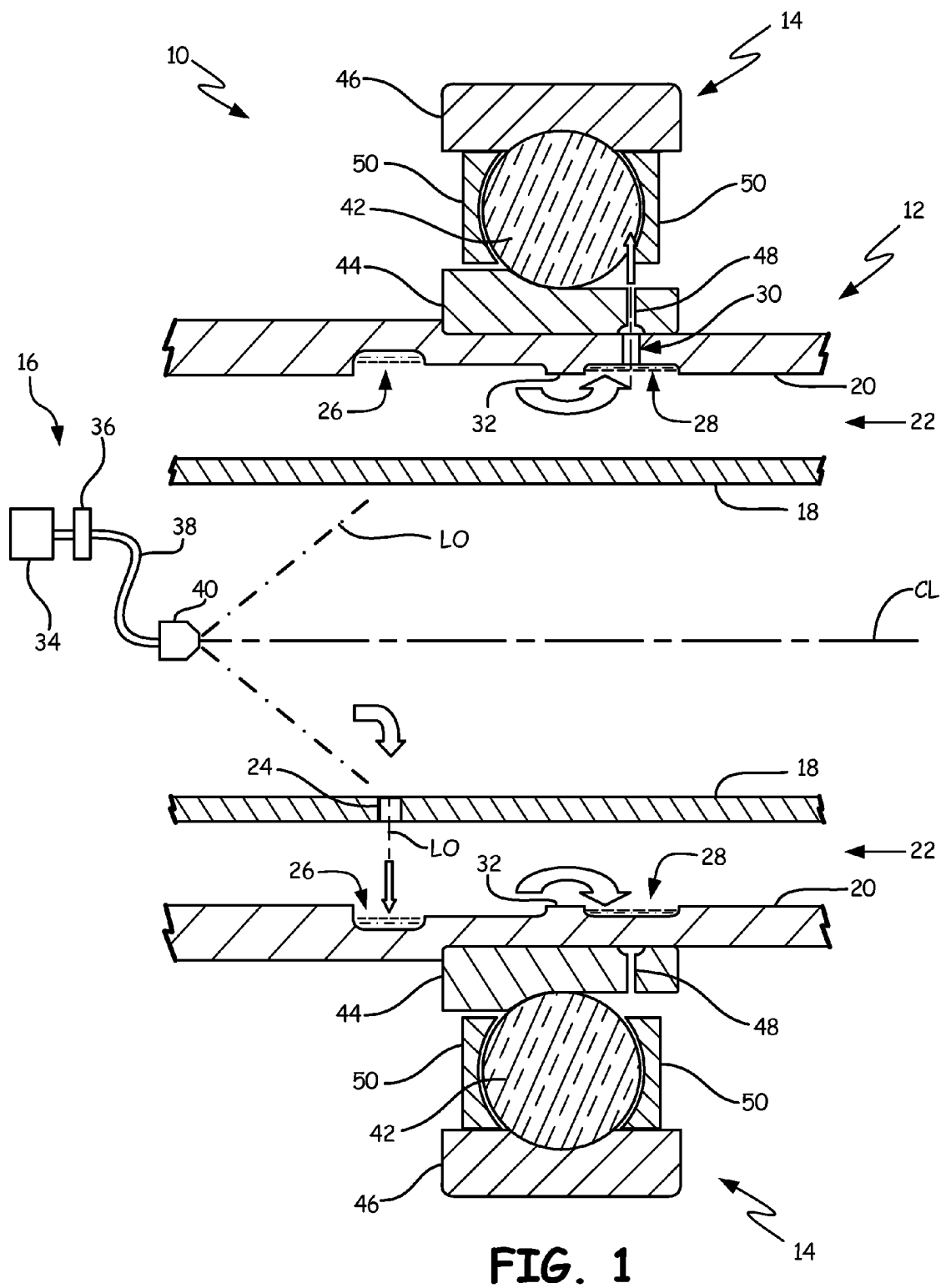
FIG. 1 is a cross-sectional side view of a bearing seal assembly in a rotary machine.

FIG. 1 is a cross-sectional side view of bearing seal assembly 10. Bearing seal assembly 10 includes shaft assembly 12, bearing assembly 14, and lubrication supply system 16.

Shaft assembly includes inner shaft 18, outer shaft 20, annulus void 22, lubricating oil LO, oil inlet port 24, first groove 26, second groove 28, oil outlet port 30, and wall 32. Lubrication supply system 16 includes external oil circuit 34, oil pump 36, oil feed tube 38, and oil tube jet 40. Bearing assembly 14 includes bearing balls 42, inner race 44, outer race 46, oil passage 48, and bearing cage 50.

Outer shaft 20 concentrically surrounds inner shaft 18. In a preferred embodiment, no sustained relative motion exists between inner shaft 18 and outer shaft 20. Inner shaft 18 is held in place relative to outer shaft 20 by way of a spline and/or o-ring seal apparatus. Annulus void 22 is formed between inner shaft 18 and outer shaft 20. Annulus void 22 receives lubricating oil LO from inner shaft 18 through oil inlet port 24 disposed in inner shaft 18. Outer shaft 20 includes first groove 26 and second groove 28. First groove 26 and second groove 28 are located on an inner radial surface of outer shaft 20. First groove 26 is radially and axially aligned with oil inlet port 24. Oil outlet port 30 is disposed in outer shaft 20 and is radially and axially aligned with second groove 28. Wall 32 is located between first groove 26 and second groove 28.

During steady-state operation of a rotary machine, inner shaft 18 and outer shaft 20 rotate and form annulus void 22 which receives lubricating oil LO from oil inlet port 24. Lubricating oil LO flows to inner shaft 18 from lubrication supply system 16. Centrifugal force induced by the rotation of inner shaft 18, and oil pressure provided by lubrication supply system 16, feeds lubricating oil LO into annulus 22 by way of oil inlet port 24 disposed in inner shaft 18. Centrifugal force induced by the rotation of outer shaft 20 causes lubricating oil LO fed to annulus 22 to collect in first groove 26 and second groove 28 located on an inner radial surface of outer shaft 20.

During steady-state operation of the rotary machine, first groove 26 is flooded with lubricating oil LO such that lubricating oil LO spills over wall 32 into second groove 28. Second groove 28 contains oil outlet port 30 to feed lubricating oil LO to bearing balls 42. During steady-state operation of the rotary machine, lubricating oil LO flows substantially unimpeded to bearing balls 42. It is important to note that during steady state operation, centrifugal force exceeds gravitational force. Centrifugal force thereby maintains a continuous oil annulus in first groove 26 such that lubricating oil LO is allowed to pass over wall 32 into second groove 28. Similarly, a concentric oil film is maintained in second groove 28 to feed bearing balls 42 with lubricating oil LO through oil outlet port 30 and oil passage 48 in inner race 44.

First groove 26 and second groove 28 may include a circumferential shape, or other shapes such as a spiral configuration. First groove 26 and second groove 28 make up a grooved structure extending the circumference of the outer shaft. Additionally, the grooved structure may include only first groove 26 and can also include more than two grooves.

Bearing assembly 14 is disposed outside of outer shaft 20. Bearing balls 42 are positioned between inner race 44 and outer race 46. Inner race 44 is located immediately adjacent to and radially outward from outer shaft 20. Inner race 44 extends the entire outer circumference of shaft assembly 12. Bearing balls 42 are located immediately adjacent to and radially outward from inner race 44. Outer race 46 is located immediately adjacent to and radially outward from bearing balls 42. Outer race 46 extends the entire outer circumference of shaft assembly 12. Oil passage 48 is disposed in inner race 46 and extends the entire circumference of shaft assembly 12. Bearing cage 50 is located on the two axial sides of bearing balls 42 and, similar to inner race 44 and outer race 46, bearing cage 50 extends the entire outer circumference of shaft assembly 12.

Inner race 44 is pressed onto the outer surface of outer shaft 20. Inner race 44, bearing balls 42, and bearing cage 50 rotate along with outer shaft 20. Outer race 46 remains stationary to the world and does not rotate along with outer shaft 20. Oil passage 48 allows for fluid communication of lubricating oil LO from shaft assembly 12 to bearing balls 42.

The majority of lubrication supply system 16 is located outside of shaft assembly 12. In lubrication supply system 16, external oil circuit 34 controls oil pump 36 which is in fluid connection with oil feed tube 38. Oil tube jet 40 is disposed on oil fed tube 38 on an end of oil feed tube 38 opposite from oil pump 36. Oil tube feed jet 40 is positioned inside inner shaft 18 along shaft centerline CL. Pressure from oil pump 36 feeds lubricating oil LO through oil feed tube 38, out of oil tube jet 40, and into an inside diameter of inner shaft 18.

Bearing seal assembly 10 of the present disclosure significantly reduces time between rotary machine startup and lubrication of bearing balls 42. A portion of lubricating oil LO is retained in second groove 28 within close proximity to bearing balls 42 during machine shutdown. Retained lubricating oil LO is delivered to bearing balls 42 during startup before sustained delivery of lubricating oil LO is established. The features of bearing seal assembly 10 incorporated on outer shaft 20 cause some quantity of lubricating oil LO to be trapped in second groove 28 during machine shutdown such that it may be delivered nearly instantly to bearing balls 42 during machine startup thereby minimizing the time bearing balls 42 are without lubrication and preventing wear on bearing balls 42 until the steady state flow of lubricating oil LO is achieved.

Lubricating oil LO retained in second groove 28 is delivered to bearing balls 42 through oil outlet port 30 as soon as the rotary machine starts rotating during startup. This quantity of lubricating oil LO provides sufficient lubrication for bearing balls 42 until steady-state flow of lubricating oil LO is reached.

Figure 2:
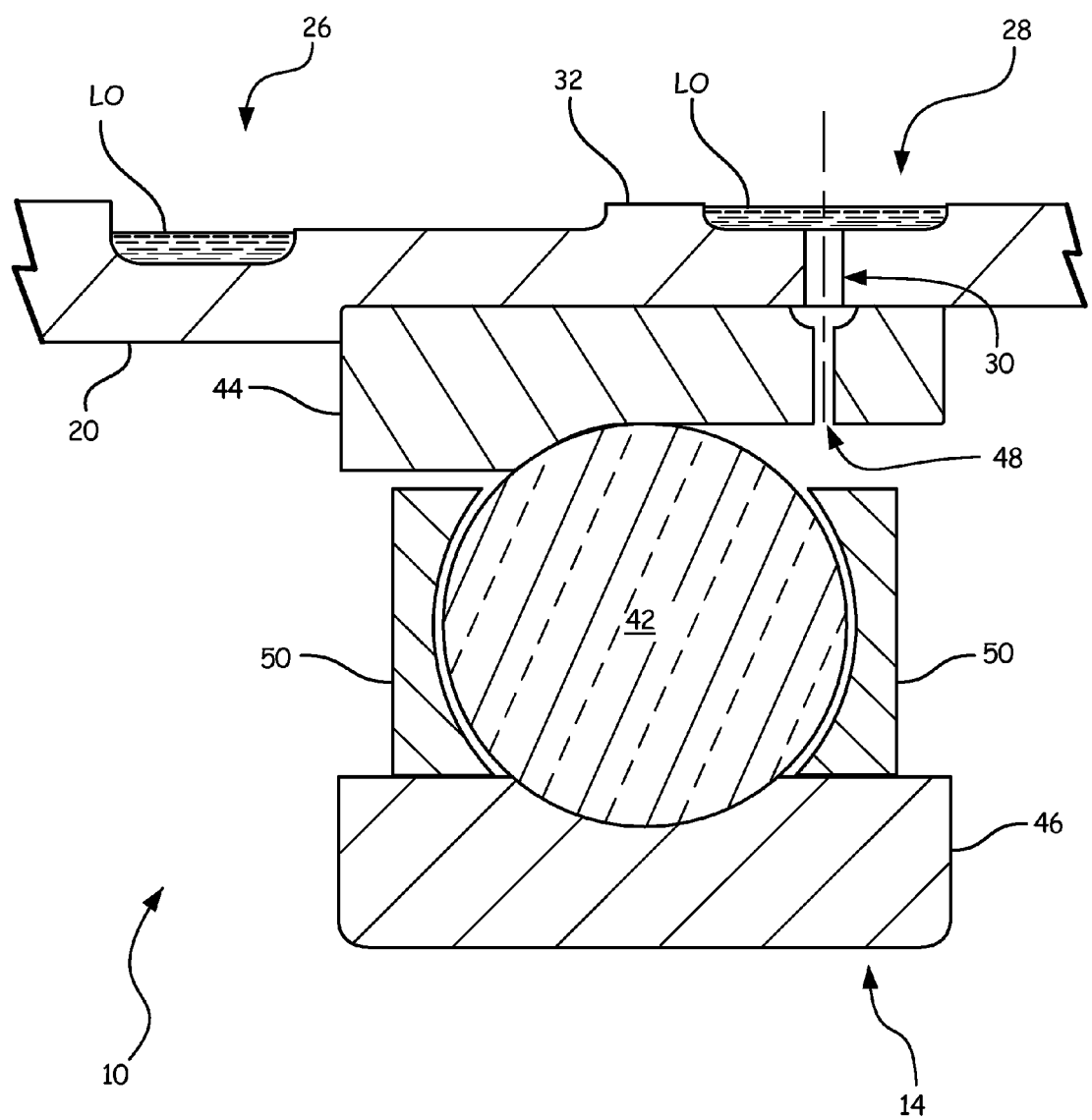
FIG. 2 is a cross-sectional side view of a bearing seal assembly in a shut-down state of a rotary machine.

FIG. 2 is a cross-sectional side view of bearing seal assembly 10 in a shut-down state. During shut-down of the rotary machine, centrifugal force, which supports the oil annulus within first groove 26, begins to diminish. As centrifugal force decreases, the oil annulus in first groove 26 begins to break down. As machine speed reduces, the oil annulus once present in first groove 26 begins to redistribute its volume to the lowest area of first groove 26. Surplus lubricating oil LO at the bottom of first groove 26 spills over wall 32 and collects in second groove 28. During shutdown, lubricating oil LO is only drained from second groove 28 as oil outlet port 30 in outer shaft 20 passes bottom dead center. Only in the unlikely event that oil outlet port 30 happens to come to rest at the bottom dead center position will lubricating oil LO drain entirely from second groove 28. It is highly probable, however, that some quantity of lubricating oil LO will remain within second groove 28 when outer shaft 20 stops rotating.

The present disclosure provides a novel and non-obvious approach at improving bearing lubrication during critical machine startup periods before sustained oil can be delivered to the bearing, thereby increasing bearing life. By storing a quantity of oil proximate to the bearing point of use, lubrication to the bearing is nearly instantaneous due to oil retained within the shaft at shutdown.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The following are non-exclusive descriptions of possible embodiments of the present invention.

A bearing seal assembly of a rotary machine includes an inner shaft and an outer shaft. The outer shaft is disposed concentrically around and radially outward from the inner shaft. The space between the inner and outer shafts forms an annulus void. The inner shaft includes an oil inlet port through which lubricating oil enters the annulus void. A grooved structure is located on an inner surface of the outer shaft, and the grooved structure is configured to retain oil upon shutdown of the rotary machine. A bearing is located outside of the outer shaft. An oil outlet port is disposed in the outer shaft and is connected to the grooved structure for supplying lubricating oil to the bearing.

The bearing seal assembly of the preceding paragraph can optionally include, additionally and/or alternatively, any one or more of the following features, configurations and/or additional components.

The grooved structure is configured to contain lubricating oil during a steady-state operation of the rotary machine.

The grooved structure is configured so that a centrifugal force of the lubricating oil maintains a substantially continuous oil annulus located in the grooved structure during steady-state operation of the rotary machine The grooved structure includes a first groove and a second groove.

A wall separates the first groove and the second groove.

The wall is configured so that excess lubricating oil in the first groove flows over the wall and into the second groove.

The oil outlet port is connected to the second groove.

A method of delivering lubricating oil to a bearing in a rotary machine includes positioning an outer shaft concentrically around and radially outward from an inner shaft. A bearing is located outside of the outer shaft. Lubricating oil is supplied to an annulus void between the inner and outer shafts through an oil inlet port during steady-state operation. During steady-state operation, a substantially continuous oil annulus is formed in a grooved structure located on an inner radial surface of the outer shaft. Lubricating oil is provided from the grooved structure through an oil outlet port in the outer shaft to the bearing during steady-state operation. At least a portion of the lubricating oil is retained in the grooved structure during a shut-down state. Lubricating oil is then provided to the bearing from the grooved structure through the oil outlet port during start-up of the rotary machine.

The method of delivering lubricating oil of the preceding paragraph can optionally include, additionally and/or alternatively, any one or more of the following steps, features, configurations and/or additional components.

The outer shaft rotates with a speed that produces a centrifugal force large enough to contain the lubricating oil within the grooved structure during steady-state operation.

The grooved structure includes a first groove and a second groove.

The first and second grooves are separated by a wall.

The excess lubricating oil in the first groove flows over the wall and into the second groove.

The oil outlet port is connected to the second groove.

The invention claimed is:

1. A bearing seal assembly of a rotary machine, the bearing seal assembly comprising:
    an inner shaft;
    an outer shaft disposed concentrically around and radially outward from the inner shaft, wherein a space between the inner shaft and the outer shaft forms an annulus void;
    an oil inlet port in the inner shaft through which lubricating oil can enter the annulus void;
    a grooved structure disposed in an inner radial surface of the outer shaft, wherein the grooved structure forms an oil retaining reservoir configured to retain a lubricating oil upon shutdown of the rotary machine, further wherein the grooved structure is configured to contain lubricating oil during a steady-state operation of the rotary machine, and further wherein the grooved structure is configured so that a centrifugal force of the lubricating oil maintains a substantially continuous oil annulus located in the grooved structure during steady-state operation of the rotary machine;
    a first groove and a second groove included in the grooved structure;
    a first portion and a second portion included in the first groove, the first portion having a larger radial diameter than the second portion;
    rolling elements located external to the outer shaft;
    an inner race positioned between the rolling elements and the outer shaft, wherein the inner race separates the rolling elements from the outer shaft; and
    an oil outlet port disposed in the outer shaft and directly fluidly connected to the grooved structure, the oil outlet port configured to supply the lubricating oil from the grooved structure through the inner race and to the rolling elements.

2. The bearing seal assembly of claim 1, wherein a wall separates the first groove and the second groove.

3. The bearing seal assembly of claim 2, wherein the wall is configured so that excess lubricating oil in the first groove flows over the wall and into the second groove.

4. The bearing seal assembly of claim 1, wherein the first portion of the first groove has a larger diameter than the second groove.

5. The bearing seal assembly of claim 1, wherein the inner race includes an oil passage fluidly connecting the oil outlet port and the rolling elements.

6. The bearing seal assembly of claim 5, wherein the oil passage is positioned in axial alignment with the oil outlet port.

7. The bearing seal assembly of claim 5, wherein the inner race and oil passage extend along a circumference of the outer shaft.

8. A method of delivering lubricating oil to a bearing in a rotary machine, the method comprising:
    supplying the lubricating oil during steady-state operation through an oil inlet port to an annulus void between an inner shaft and an outer shaft;
    forming a substantially continuous oil annulus in a grooved structure during steady-state operation, wherein the grooved structure is located on an inner radial surface of the outer shaft, further wherein the grooved structure is configured to contain lubricating oil during a steady-state operation of the rotary machine, and further wherein the grooved structure is configured so that a centrifugal force of the lubricating oil maintains a substantially continuous oil annulus located in the grooved structure during steady-state operation of the rotary machine, further wherein the grooved structure includes a first groove and a second groove, and further wherein the first groove includes a first portion and a second portion, the first portion having a larger radial diameter than the second portion;
    providing lubricating oil from the grooved structure through an oil outlet port in the outer shaft and through an inner race to rolling elements during steady-state operation, wherein the inner race separates the rolling elements from the outer shaft;
    retaining at least a portion of the lubricating oil in the grooved structure during a shut-down state; and
    providing lubricating oil to the rolling elements from the grooved structure through the oil outlet port during start-up of the rotary machine.

9. The method of claim 8, wherein during steady-state operation the outer shaft rotates with a speed that produces a centrifugal force large enough to contain the lubricating oil within the grooved structure.

10. The method of claim 8, wherein a wall separates the first groove and the second groove.

11. The method of claim 10, wherein excess lubricating oil in the first groove flows over the wall and into the second groove.

12. The method of claim 10 and further comprising:
    passing lubricating oil from the first groove over the wall and into the second groove.

13. The method of claim 8, wherein providing lubricating oil from the grooved structure through the oil outlet port in the outer shaft and through the inner race to the rolling elements during steady-state operation further includes passing lubricating oil through an oil passage in the inner race.

14. The method of claim 8, wherein providing lubricating oil to the rolling elements from the grooved structure through the oil outlet port during start-up of the rotary machine further includes passing lubricating oil through the inner race.

* * * * *